United States Patent
Carr et al.

(10) Patent No.: US 7,246,123 B2
(45) Date of Patent: Jul. 17, 2007

(54) AUTOMATIC TRANSACTION MANAGEMENT

(75) Inventors: Richard W. Carr, Palo Alto, CA (US); Barbara E. Schilling, Palo Alto, CA (US); Johanne C. Corbeil, Mountain View, CA (US); Harry P. Scott, Duxbury, MA (US)

(73) Assignee: Carr Scott Software Incorporated, Duxbury, MA (US)

( * ) Notice: Subject to any disclaimer, the term of this patent is extended or adjusted under 35 U.S.C. 154(b) by 0 days.

(21) Appl. No.: 10/343,862

(22) PCT Filed: Aug. 6, 2001

(86) PCT No.: PCT/US01/24767

§ 371 (c)(1),
(2), (4) Date: Aug. 26, 2003

(87) PCT Pub. No.: WO02/13068

PCT Pub. Date: Feb. 14, 2002

(65) Prior Publication Data

US 2005/0102250 A1    May 12, 2005

Related U.S. Application Data

(60) Provisional application No. 60/222,861, filed on Aug. 4, 2000.

(51) Int. Cl.
*G06F 17/30* (2006.01)
(52) U.S. Cl. .................. 707/10; 707/101; 707/102; 707/103 Y; 707/104.1

(58) Field of Classification Search ................ 707/103, 707/202, 204, 100, 203, 1, 10, 101, 102, 707/103 Y, 104.1, 3; 705/1, 9, 35, 65, 26; 714/2; 709/227; 718/102
See application file for complete search history.

(56) References Cited

U.S. PATENT DOCUMENTS

| | | | |
|---|---|---|---|
| 5,561,795 A * | 10/1996 | Sarkar | 707/202 |
| 5,581,749 A * | 12/1996 | Hossain et al. | 707/10 |
| 5,682,527 A | 10/1997 | Cooper et al. | |
| 5,761,661 A | 6/1998 | Coussens et al. | |
| 5,794,252 A | 8/1998 | Bailey et al. | |
| 5,835,915 A | 11/1998 | Carr et al. | |
| 5,857,204 A * | 1/1999 | Lordi et al. | 707/202 |
| 5,896,530 A * | 4/1999 | White | 718/102 |
| 6,009,405 A * | 12/1999 | Leymann et al. | 705/9 |
| 6,115,715 A * | 9/2000 | Traversat et al. | 707/100 |
| 6,119,129 A * | 9/2000 | Traversat et al. | 707/202 |
| 6,157,927 A * | 12/2000 | Schaefer et al. | 707/103 R |

(Continued)

*Primary Examiner*—Thuy N. Pardo
(74) *Attorney, Agent, or Firm*—Townsend & Townsend & Crew LLP

(57) ABSTRACT

In processing system that includes a processing element communicatively coupled to a storage system for storage of database files (35) managed by a database management system (34) having a transaction management facility (36), file access operations from application processes are intercepted and checked to determine if the operation is from a non-transactional process, and if so, whether an automatic transaction should be started for the operation.

22 Claims, 4 Drawing Sheets

U.S. PATENT DOCUMENTS

| | | |
|---|---|---|
| 6,266,698 B1 * | 7/2001 | Klein et al. .................. 709/227 |
| 6,324,523 B1 * | 11/2001 | Killeen et al. ................. 705/35 |
| 6,377,948 B2 * | 4/2002 | Kikuchi et al. ............... 707/10 |
| 6,442,552 B1 * | 8/2002 | Frolund et al. ............... 707/10 |
| 6,519,568 B1 * | 2/2003 | Harvey et al. .................. 705/1 |
| 6,553,392 B1 * | 4/2003 | Mosher et al. .............. 707/204 |
| 6,662,307 B1 * | 12/2003 | Sipple et al. .................. 714/2 |
| 6,925,468 B1 * | 8/2005 | Bobbitt et al. ............... 707/102 |
| 2001/0044792 A1 * | 11/2001 | Kikuchi et al. ................ 707/3 |
| 2002/0077929 A1 * | 6/2002 | Knorr et al. ................... 705/26 |
| 2002/0178026 A1 * | 11/2002 | Robertson et al. ............. 705/1 |
| 2003/0061171 A1 * | 3/2003 | Gilbert et al. ................ 705/65 |
| 2005/0102250 A1 * | 5/2005 | Carr et al. ...................... 707/1 |
| 2005/0120036 A1 * | 6/2005 | Verma et al. ............... 707/100 |

* cited by examiner

AUTOMATIC TRANSACTION MANAGEMENT

CROSS-REFERENCES TO RELATED APPLICATIONS

This application claims the benefit of U.S. Provisional Application No. 60/222,861, filed Aug. 4, 2000, the disclosure of which is incorporated by reference.

BACKGROUND OF THE INVENTION

The present invention relates generally to data processing using transaction processing in which changes to a database are recorded in an audit file to provide recovery of the database in the face of a failure. More particularly, the invention is directed to a method of providing automatic transaction capability to programs not configured for transaction processing.

Real world commerce involves transactions. A transaction may involve some commercial activity, such as a deposit to a bank account, or a transfer of funds from one bank account or another, or a sale of a product. In order to maintain a record of the transaction, it will be recorded in a database, preferably in a consistent manner. For example, a transfer of funds from one account to another will require a database change that will reduce the one account by the amount of the transfer, and augment the other account by that same amount. If the change is effected properly, the database change is kept consistent. If, however, a failure occurs during the change, there is a question of whether the entire transaction was recorded, i.e., if the database was changed to reflect the reduction of one account, was the database also changed to reflect the increase of the other account.

To ensure that the database remains accurate after the changes/modifications, the paradigm of transaction processing was developed. A transaction itself is often defined as an explicitly delimited operation or set of operations that change or otherwise modify the content of a database from one consistent state to another. Changes or modifications are treated as a single unit in that all changes/modifications of a transaction are formed and made permanent (i.e., the transaction is "committed"), or none of the changes are made permanent (the transaction is "aborted"). Failure occurring during the execution of a transaction will result in the transaction being aborted, and whatever changes were made to a database are undone to return it to a consistent state. A transaction, then, is said to guarantee Atomicity, Consistency, Isolation, and Durability.

Before a transaction commits its changes to the database, audit information about the database change/modification is written to a so-called "audit log" (or "audit trail"). At a conceptual level, an audit log can be viewed as a history of changes to a database, and information from the audit log will allow the database to redo or undo update operations as required. The audit log information may also be used to reconstruct the database in the event of a catastrophic event that corrupts or otherwise destroys the database.

Databases that ate managed with transactions have some inherent advantages. Updates to the database are permanently recorded in the audit file on magnetic media. This permits the database manager to:

Recover files that are lost when a database storage device is permanently damaged, Create and maintain a duplicate copy of the database in a remote location, and Improve performance by eliminating I/O operations that can be recovered (in the event of a failure) from the audit log.

In order to use transactions, an application program must be able to issue the necessary instructions to the transaction manager to initiate and manage transactions. Those instructions often include:

A "BEGIN" instruction to initiate a transaction before locking or updating records. It is possible for a process to BEGIN multiple transactions and to associate each change/modification with a specific transaction.

A "COMMIT" instruction, which commits a transaction when a related set of database updates are complete; this will cause all database updates associated with that transaction to become permanent.

An "ABORT" instruction to terminate a transaction when it is discovered that some factor would preclude making a set of consistent database updates; this causes all updates associated with that transaction to be undone, as if they had never been made.

A "RESUME" instruction to choose between one or more active transactions, thus allowing a process to specify a particular transaction for each I/O operation.

A program that makes effective use of transactions is called a "transactional application."

There are many existing applications are able to modify a database of one sort or another, often composed of hundreds and thousands of programs, that for one reason or another are not transactional applications; that is, they were not initially designed and prepared to include the necessary transaction instructions and programming logic to manage transactions. Nevertheless, it will be evident that such applications would certainly benefit from the use of transactions. Unfortunately the cost and risk of reprogramming these applications in order to add the necessary instructions for transaction utilization is high, often too high to justify the effort.

Furthermore, there are also transactional applications that only use transactions for a subset of the database. In many cases, it may not be desirable to use the same transaction for certain files, such as error logs, because the ABORT operation would undo updates that should be preserved. It is sometimes desirable to use transactions to manage updates to these files, but only if the transactions are managed separately from the original transactions.

Thus, there exists a need for a way to provide those applications that are without the necessary programming logic for transaction use to still be able to still be able to do so without the risk and expense of adding the necessary programming code.

BRIEF SUMMARY OF THE INVENTION

The present invention provides a method of enabling computer applications that have not been structured to use transactions, i.e., are unable to issue the necessary transaction instructions (called "non-transactional" applications), to access an audited (transactional) database and gain most of the benefits of transaction processing. This access is achieved without requiring any reprogramming of the applications. In addition, there is provided a number of innovative features to allow a user to configure transaction management for selectivity, performance, or isolation.

Broadly, the present invention comprises several software modules, the most significant of which is the "Intercept Module." The Intercept Module is configured as a software layer between all application programs and the operating system (OS; which will typically include a file system and a transaction manager). The intercept module intercepts all relevant calls made by the application to the OS, performs additional operations to provide automatic transaction processing, and also passes the calls on to the OS.

When appropriate, the Intercept Module will make transaction requests to manage automatic transactions. These include issuing BEGIN, COMMIT, and RESUME instructions to initiate and manage transaction processing for non-transactional applications accessing audited databases.

The present invention, therefore directly enables a non-transactional application to enjoy many of the advantages provided by transaction processing by allowing the user to audit the database without making any changes to application programs. For example, the invention will allow non-transactional applications to make effective use of transactions, thereby assuring that the database remains durable and recoverable.

A further advantage of the invention is that it provides a user with the capability of making application changes in an incremental manner. Without the features provided by the present invention, a user would have to change all non-transactional applications that needed transaction before a database used by the application can be audited; this greatly increases the risk of problems and loss of business revenue.

These and other advantages and aspects of the invention will become apparent to those skilled in this art upon a reading of the following detailed description of the invention, which should be taken in conjunction with the accompanying drawings.

DETAILED DESCRIPTION OF THE INVENTION

Figure 1:
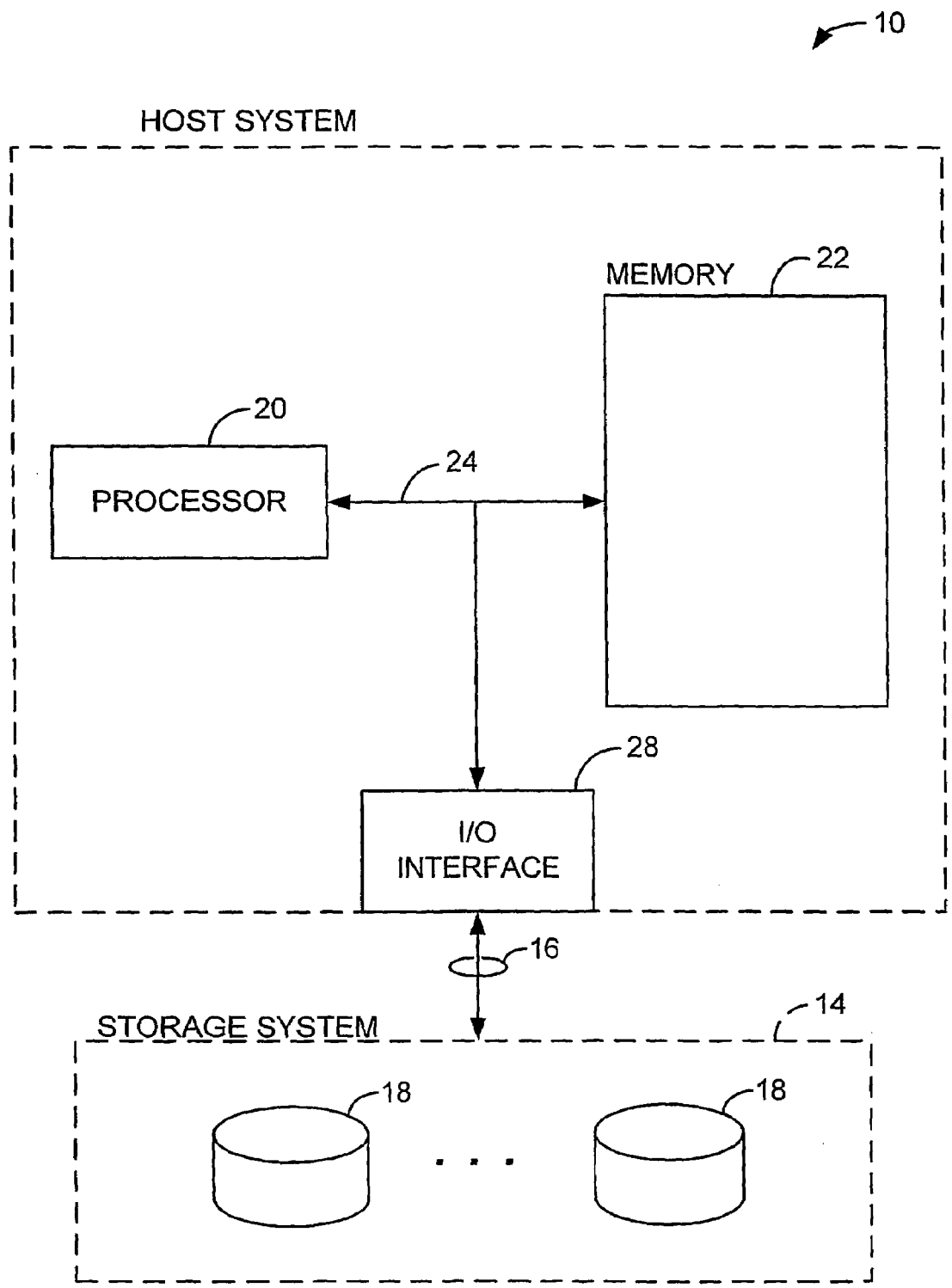
FIG. 1 is a block diagram broadly illustrating a processing system for implementing the present invention.

Turning now to the figures, and for the moment specifically FIG. 1, there is illustrated a processing system 10 for implementing the present invention. As FIG. 1 shows, the processing system 10 includes a host system 12 that is communicatively coupled to a storage system 14 by an I/O structure 16. The I/O structure may be a bus structure or some form of network connection for allowing the host system 12 and storage system 14 to communicate and pass data between one another. The storage system 14, preferably comprising one or more disk units 18, operates to store data files received from the host system 12 for later retrieval in conventional fashion.

The host system 12 includes at least one processor unit 20 and a memory element 22 that are coupled to one another, and to such other support electronics (not shown) as would be necessary, by a system bus 24. The system bus 24 also couples the processor 20 and memory 22 to an I/O interface 28 that, in turn, couples the host system 12 to the I/O structure 16.

The host system 12 is illustrated as a single processor system, but those skilled in this art will readily appreciate that the host system 12 may be a multiprocessing environment in which multiple processors share communication access to the storage system 14. Such a multiprocessing environment may either be a number of multiple processors coupled to the storage system 14 through a network of one type or another, or it may be a symmetrical multiprocessor environment in which the processor 20 actually comprises a group of processors that share the memory 22 and all running processes with access to the storage system 14. The present invention will operate with any environment on a processor by processor basis, as will be seen below.

Figure 2:
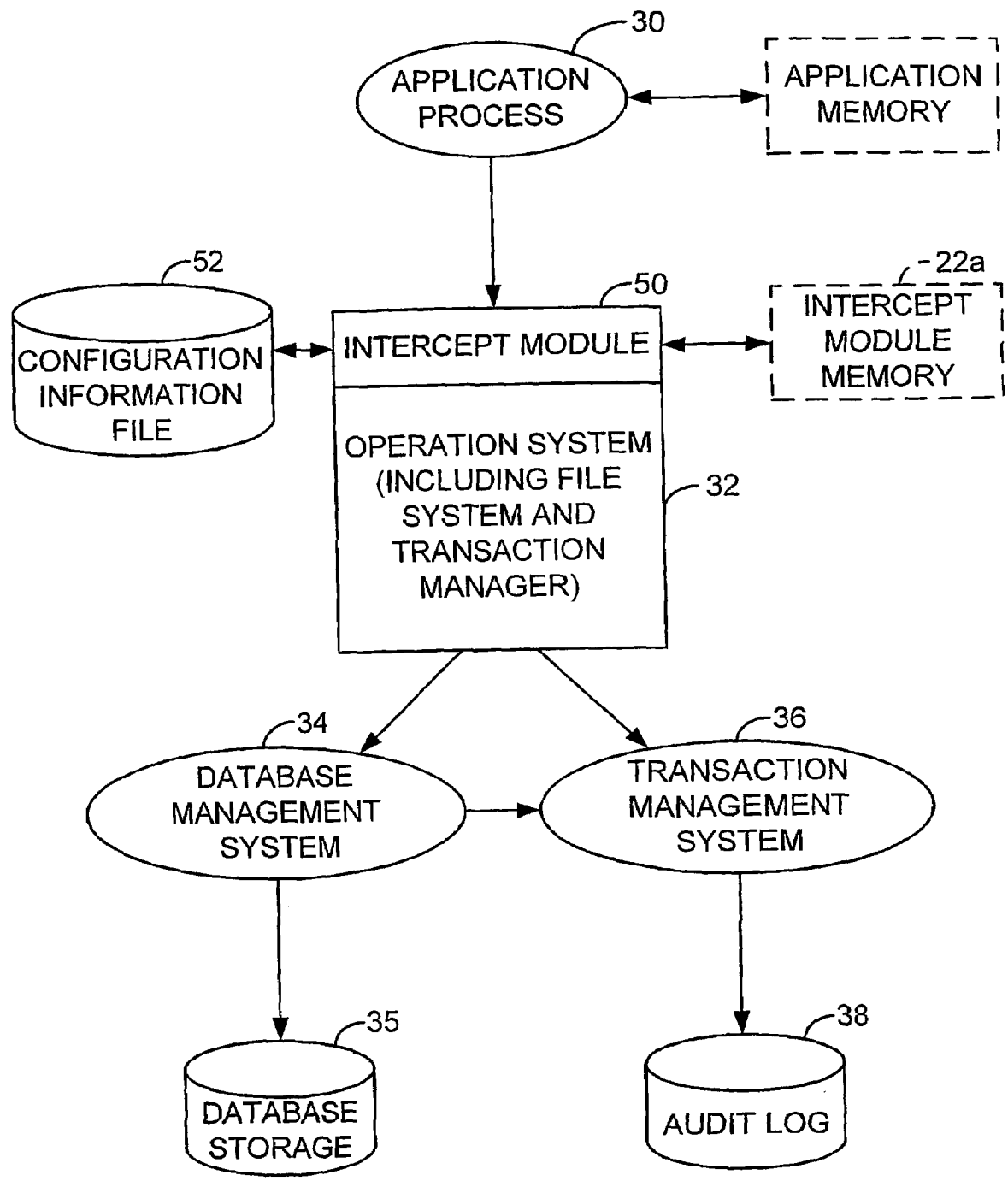
FIG. 2 is a diagrammatic representation of certain modules of the invention, illustrating implementation of the invention in the processing system of FIG. 1.

FIG. 2 is a diagrammatic representation of the software construct that would execute on the processor 20 to implement the present invention. As FIG. 2 shows, an application process 30 is in communication with an operating/file system (OS) 32, which, as indicated above, will usually incorporate the file system and the transaction manager. File access calls from the application process 30 are sent to the OS 32 that, in turn, passes them to a database management system 34 for accessing a database storage 35 that forms a part of the storage system 14. In the single processor environment, the application process 30, OS 32, and database management system 34 will all be running on the single processor. In a multiprocessing environment, the database management system, and even portions of the OS 32, could be resident on different ones of the multiple processors (not shown).

As is conventional, both the application process 30 and the database management system 34 communicate with a transaction management system 36 in order to implement transaction processing on audited files. The application process 30 makes transaction calls to the transaction manager module of the OS 32 to associate transactions with requests to the database manager. The database management system 34 sends audit information to the transaction management system 36 to be written to the audit log 38. Information in the audit log 38 will allow transactions to be aborted and rolled back, as described above, or in the event a database is corrupted, allow recreation of that database up to and including the last committed transaction.

However, in order to take advantage of the features offered by transaction management, the application process 30 will need to include the necessary transaction instructions such as BEGIN, COMMIT, etc., which a transactional application will have. If the application process 30 is not a transactional process, the present invention will detect accesses made to audited files and automatically add the necessary transaction instructions.

The present invention, as FIG. 2 illustrates, includes an intercept module 50 and an associated configuration information file 52. The invention is installed on the processor 20 so that the intercept module 50 operates to intercept all file access calls from the application process 30 before they are received by the OS 32. In addition, a separate area of memory 22 (FIG. 1), intercept module memory 22a, is allocated to the intercept module 50 for recording state information as described below. And, although not specifically shown in FIG. 2, communication between the configuration file 52 and the intercept module 50 is preferably through an information caching process.

The primary service provided by the present invention is automatic transaction management, and the principle functions of that service will include:

System Call Interception—This function includes detecting the relevant file access calls by the process to perform database and other operations, and when necessary to modify those operations to achieve the desired results.

Global Configuration Determination—This function provides user-configurable parameters to control aspects of automatic transaction management for all files.

File Configuration Determination—This function provides user-configurable parameters to control aspects of automatic transaction management for specific files.

Program Configuration Determination—This function provides user-configurable parameters to control aspects of automatic transaction management for all files, but for specific programs.

Program Operation Tracking—As the application process 30 accesses files and manages transactions, this function determines which operations are being performed and records various state information required for effective automatic transaction management.

Process Transaction Tracking—Intercept and remember changes to the current transaction of the application process 30.

Lock and Update Tracking—As the application process 30 accesses files, this function determines the logical use of file and record locks, including noting when database updates have been performed.

Automatic Transaction Management—This function performs the basic management of transactions, such issuing the necessary transaction calls for starting and committing transactions.

Advanced Automatic Transaction Management—This function performs a number of advanced and configurable operations, including no wait transactions, common and separate transactions. The intercept module 50 maintains information respecting this function, as well as information respecting the file and global determinations described above, in the configuration file 52.

Transaction Isolation—Provide the desired level of isolation between each automatic transaction and external processing that may depend on the database consistency affected by automatic transaction.

Process Termination Tracking—Determine other operations that are important to effective transaction management, especially all operation that may lead to process termination.

Audited File Creation—Intercept file creation requests and, if configured, creates an audited file.

Special Operations—Perform some operations that are not allowed on audited files (even with a transaction) in a way that is compatible with existing application programming logic. These operations include file renaming and bulk transfer operations.

Error Processing—Determine proper operations when the OS 32 signals an error.

System Call Interception

The intercept module 50 of the present invention is a collection of executable routines. The intercept module 50 is installed between the application process 30 and the OS 32, as illustrated in FIG. 2, to intercept all operations made by application programs (e.g., application process 30) to open or close files, to access the database, to manage transactions, to communicate with other processes and devices, and to terminate the application process.

In most cases, the intercept module 50 will pass the operations on to the OS 32 with no change. In a few special cases, the intercept module will cause performance of some alternative operation, but the usual intent of the interception is to initiate additional operations to provide non-transactional processes with transaction management processing.

Global Configuration

When a program is executed, the intercept module 50 accesses the Configuration Information file 52 to determine if any global parameters have been configured. The specific global configuration parameters include:

Enable or Disable Automatic Transactions—This parameter allows the user to disable all functions of the invention without removing the invention.

Enable or Disable Common Transaction—As described below, all audited files are eligible for automatic transaction management—by default. This parameter allows the user to disable automatic transactions unless they are specifically configured for a particular file.

Weak, Normal, or Strong Isolation—As described further below, this parameter controls the management of automatic transactions so that they are isolated from operations outside the process.

No Wait Transactions—This parameter specifies that automatic transactions should be committed using a technique that precludes the application process 20 from having to wait until the transaction has completed.

Maximum Transaction Updates and Maximum Transaction Time—For batch processing, guidelines as to how often any automatic transaction initiated by the invention should be committed.

File Configuration

Each time the application process 30 opens a file, by a call to the OS 32, the intercept module 50 will intercept that call. It will then determine if the file is an audited disk file and, if so, access the Configuration Information file 52 to determine if it has been configured for special parameters of automatic transaction management.

In most cases, it is not necessary for the user to configure files for automatic transactions. By default, all audited files are eligible for automatic transaction management if the process is non-transactional. In other words, if the application process 30 attempts to access an audited file and the program has not made calls to specify a transaction, then the intercept module 52, will provide transactions automatically by issuing the necessary transaction instructions.

The present invention allows a user to specify a number of useful configuration parameters for each audited file—maintained by the intercept module 50 as part of the configuration information 52. The specific configuration parameters for a file include:

Common Transaction—File operations should be managed with an automatic transaction and the transaction can be shared with operations on other file-opens. (A "file-open" is a common operating system identifier that is created by an operating system when an OPEN is issued by an application process for a particular file. The identifier is returned to the application process and thereafter used to by the application process for all file accesses until a CLOSE call is issued by the application process.) Specifying this parameter forces the use of an automatic transaction, even if the application is transactional and has made calls to specify a transaction.

Separate Transaction—File operations should be managed with an automatic transaction that is independent of automatic transactions for other files. Specifying this parameter forces the use of an automatic transaction, even if the application is transactional and has made calls to specify a transaction.

No Transaction—File operations should never be managed with automatic transactions.

No Wait Transaction—automatic transactions should be committed using a technique that precludes the application process 30 from having to wait until the transaction has completed.

Maximum Transaction Updates and Maximum Transaction Time—For batch processing, guidelines as to how often an automatic transaction initiated by the invention should be committed.

Audited File Creation—If the application process 30 creates the file, this configuration parameter causes the file to be created as an audited file.

Audited File Attribute Concealment—If the application process performs an operation to determine if the file is audited, the result will indicate that the file is not audited.

Program Configuration

The invention allows the user to specify configuration parameters (part of the Configuration Information File 52) for specific programs. These parameters are similar to the global configuration as they apply to all files, but only for specific programs. The specific configuration parameters for a program include:

Enable or Disable Automatic Transactions—This parameter allows the user to disable all automatic transaction management in the program.

Enable or Disable Common Transaction—As described below, all audited files are eligible for automatic transaction management, by default. This parameter allows the user to disable automatic transactions unless they are specifically configured for a particular file.

Weak, Normal, or Strong Isolation—As described further below, this parameter controls the management of automatic transactions so that they are isolated from operations outside the process.

No Wait Transactions—This parameter specifies that automatic transactions should be committed using a technique that precludes the application process 20 from having to wait until the transaction has completed.

Maximum Transaction Updates and Maximum Transaction Time—For batch processing, guidelines as to how often any automatic transaction initiated by the invention should be committed.

A program configuration parameter overrides any similar global configuration parameter.

Program Operation Tracking

The intercept module 50 must be aware of and manage two different states of the program:

the logical (or virtual) state, that is, the state without automatic transactions, and the actual state with automatic transactions offered by the present invention.

In each program, or process, the intercept module 50 maintains, in the intercept module memory 22*a*, the following state information:

Global Parameters—As described above, global parameters are obtained from the configuration file and stored in the local state information.

Current Process Transaction—If the application process 20 is transactional, that is, it performs operations that manage transactions, the intercept module records the transaction identifier of the current transaction. If the program is non-transactional, or the application process 20 has no transaction, the current process transaction is said to be the null transaction.

File Table—For each file opened by the program, the intercept module maintains the following state information:

File configuration parameters are obtained from the Configuration Information File and stored in the file table.

Audited-Switch—an indicator that the file is audited.

Automatic-Transaction-Switch—an indicator that file operations are being managed with automatic transactions.

Separate-Transaction-Switch—an indicator that file operations are being managed with separate transactions.

Auto-Transaction-ID—the identifier of the automatic transaction, if any, that is currently being used for operations on the file.

Transaction-Begin-Time—the time that the automatic transaction was begun.

Transaction-Update-Count—A count of file updates made under the transaction.

Locked-File-Switch—an indicator that the file is currently locked by the application process 20.

Locked-Record-Count—a count of file records that are currently locked by the application process 20.

Process Transaction Tracking

As described below, automatic transactions are normally supplied only if the application program 30 does not manage transactions on its own behalf. Correct management of automatic transactions requires careful tracking of transactions that are managed by the application program.

The invention intercepts the basic transaction operations, such as BEGIN, COMMIT, ABORT, and RESUME, to determine, at all times, the Current Process Transaction, if any. If the process has no transaction, it is also said to have the null transaction.

Lock and Update Tracking

Correct management of database locks is a key requirement of maintaining a correct and consistent database. If the application process 30 has requested a record or file lock, such a lock must never be released until the process performs an operation that would unlock the record or file. Otherwise, improper concurrent access to the record or file by another process can corrupt the database. On the other hand, if locks are held longer than specified by the process, the database will not be corrupted, but performance may suffer due to lock contention.

The invention operates to determine the boundaries of an automatic transaction in order to provide correct locking behavior with the least amount of increased lock contention. The invention tracks the locking operations performed by the program and ensures that actual locking, with automatic transactions, is compatible with the intended locking behavior.

When the invention manages automatic transactions for audited file operations, it assumes that the application process 30 was originally designed to work with unaudited file operations. One of the primary differences between unaudited and audited files is the management of record and file locks when records are updated:

With an unaudited file, the program must unlock records explicitly using file operations that request to unlock a record or file.

With an audited file, the program cannot unlock a record or file that was updated under a transaction; instead only the transaction COMMIT or ABORT will unlock the record or file.

Another difference is that inserting a record into an unaudited file does not lock the record; with an audited file, the record is locked until the transaction is committed.

For each file operation issued by the application process, the invention will track record and file locking in the Locked-Record-Count and Locked-File-Switch for the file.

In addition, it also tracks the number of file updates in Transaction-Update-Count. The intercept module 50 records the information in data structures maintained in the intercept module memory 22*a*. The basic operational rules are as outlined in Table 1, below:

TABLE 1

| File Access Operation | Processing |
| --- | --- |
| READ WITH LOCK or LOCK RECORD | Increment Locked-Record-Count. |
| UPDATE WITH UNLOCK or UNLOCK RECORD | Decrement Locked-Record-Count. Increment Transaction-Update-Count. |
| UPDATE (without UNLOCK), DELETE or INSERT | Increment Transaction-Update-Count. |
| LOCK FILE | Set Locked-File-Switch to true. |
| UNLOCK FILE or CLOSE FILE | Set Locked-File-Switch to false. Set Locked-Record-Count to zero. |

The intercept module 50 tracks duplicate unlocking operations that are common in real applications, such as an UPDATE WITH UNLOCK operation followed by an UNLOCK RECORD operation for the same record. Such a sequence should only decrement the Locked-Record-Count once. When an UPDATE DELETE, INSERT, UNLOCK RECORD, UNLOCK FILE, or CLOSE FILE operation is complete, there is a logical (implicit or explicit) unlocking of records in a non-transactional program. The invention updates the appropriate lock counts of the logical state (Locked-File-Switch and Locked-Record-Count); this is described in Table 1.

Automatic Transaction Management

When the intercept module 50 intercepts the first access operation for a file-open that would require a transaction to be successful, it will decide if automatic transactions should be provided needed to perform the operation. If the file is audited, it uses the following rules to make that decision:

If a global-, file-, or program-configuration parameter disables automatic transactions, they will not be provided.

If the file configuration parameters are explicitly configured for automatic transactions, they will be provided for all accesses for the file-open.

If there is no explicit configuration and there is no current process transaction, then automatic transactions will be provided. If there is current process transaction, then it is assumed that the program is transactional and will provide all necessary transactions for the file-open.

Thus, the basic intent of the invention is to provide automatic transactions when the program is non-transactional. It is not necessary for the user to indicate which programs are non-transactional; this is determined dynamically by the invention.

If the first file access operation is determined to need an automatic transaction, then Automatic-Transaction-Switch of the state information is set to true. All subsequent file access operations will also use automatic transactions, even if there is a current process transaction.

If a file access operation requires an automatic transaction and the intercept module has already begun an appropriate automatic transaction, it simply RESUMEs use of that transaction; otherwise the intercept module requests to BEGIN a new transaction. The transaction identifier is saved in the Auto-Transaction-ID of the state information.

Table 2, below, delineates the processing that is performed by the intercept module 50 prior to each file access operation on an audited file that is selected for automatic transaction:

TABLE 2

| Transactional File Access Operation | Processing Before Operation |
| --- | --- |
| READ (not locking) | RESUME the automatic transaction if one has been begun. The record may be locked by the process and require the transaction. Otherwise it is not necessary to use a transaction. |
| READ WITH LOCK or LOCK RECORD | BEGIN or RESUME an automatic transaction. Locking a record requires a transaction. Save key of locked record. |
| UNLOCK RECORD | BEGIN or RESUME an automatic transaction. Unlocking a record requires a transaction (even if there is no record locked). |
| LOCK FILE | BEGIN or RESUME an automatic transaction. |
| UNLOCK FILE | BEGIN or RESUME an automatic transaction. Unlocking a file requires a transaction (even if the file and all its records are already unlocked). |
| INSERT | BEGIN or RESUME an automatic transaction. |
| UPDATE or DELETE | BEGIN or RESUME an automatic transaction. If the record being updated has not been locked, perform a LOCK RECORD under the automatic transaction. |

Figure 3:
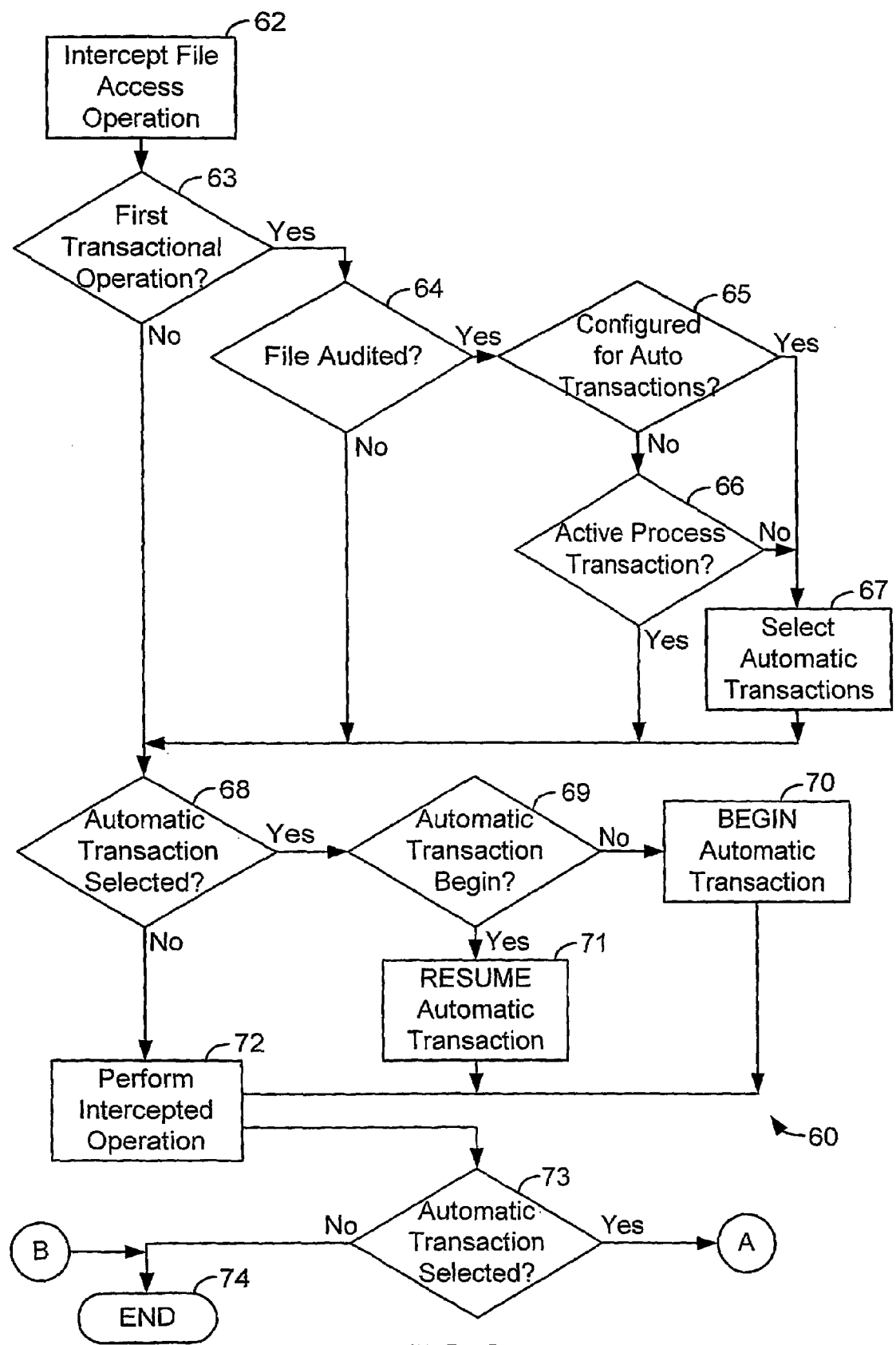
FIG. 3 is a flow diagram that broadly illustrates the major steps taken to determine if an automatic transaction should be initiated according to the present invention.

The flow diagram 60, shown in FIG. 3, illustrates the major steps taken, in accordance with the rules of Table 2, to decide what to do when a file access operation is intercepted by the intercept module 50 (FIG. 1).

As is normal, an OPEN (or similar) call to the OS 32 will precede a file access operation. The OS 32 will create a "file-open" identifier for the particular OPEN, and return the identifier to the application process. Thereafter, all further file accesses will use the file-open (which indirectly identifies the file, among other things) until a CLOSE call is issued by the application process.

The flow diagram 60 begins with step 62 when a file operation on a file is intercepted. Next, step 63 checks to see of the intercepted file operation is a first operation, requiring a transaction (e.g., is it a READ with a LOCK operation). If so, step 63 will be left in favor of a check, in step 64, to determine if a transaction is required, i.e., is the file that is identified in the operation an audited file. In step 64, the intercept module 50 will ask the file system of the OS 32 if the particular file of the file operation is audited. If the file is audited, step 65 will check to see if the file has been configured by the user for automatic transactions. If the file has not been so configured, step 66 checks the current process transaction; if there is such a transaction, then processing proceeds to step 68. If step 65 does determine that the file is configured for automatic transactions, or step 66 determines there is no process transaction then step 67 is entered to mark the file-open (the common operating system identifier for the file operation, as explained above) as being selected for automatic transactions. All of the processing described above then passes, via either step 63, or step 64, or step 65, or step 66, or step 67, to step 68.

Step 68 checks to see if the file is marked as selected for automatic transactions as a consequence of steps 63 through 67 on the first transactional operation. If so, step 69 determines if there already is, an automatic transaction for the file-open. If there is no transaction, a new transaction is begun in step 70 by a BEGIN instruction issuing from the intercept module 50 to the OS 32; otherwise, the existing transaction is activated with a RESUME request in step 71. Then, step 68, 70, or 71 is left to step 72 where the intercept module 50 will pass the file operation, unaltered, to the OS 32 to perform the operation.

Following step 72, a check is made in step 73 to determine if the file operation was performed under an automatic transaction (i.e., either step 70 or 71 was executed). If not, the procedure of flow diagram ends with step 74. If, however, step 73 finds that the operation was within an automatic transaction, post-processing is necessary, primarily to determine if the automatic transaction is to be committed. Accordingly, before the procedure of flow diagram 60 is terminated, the procedure exits step 73 at A to proceed to the post-processing procedure shown in the flow diagram 90 shown in FIG. 4.

Figure 4:
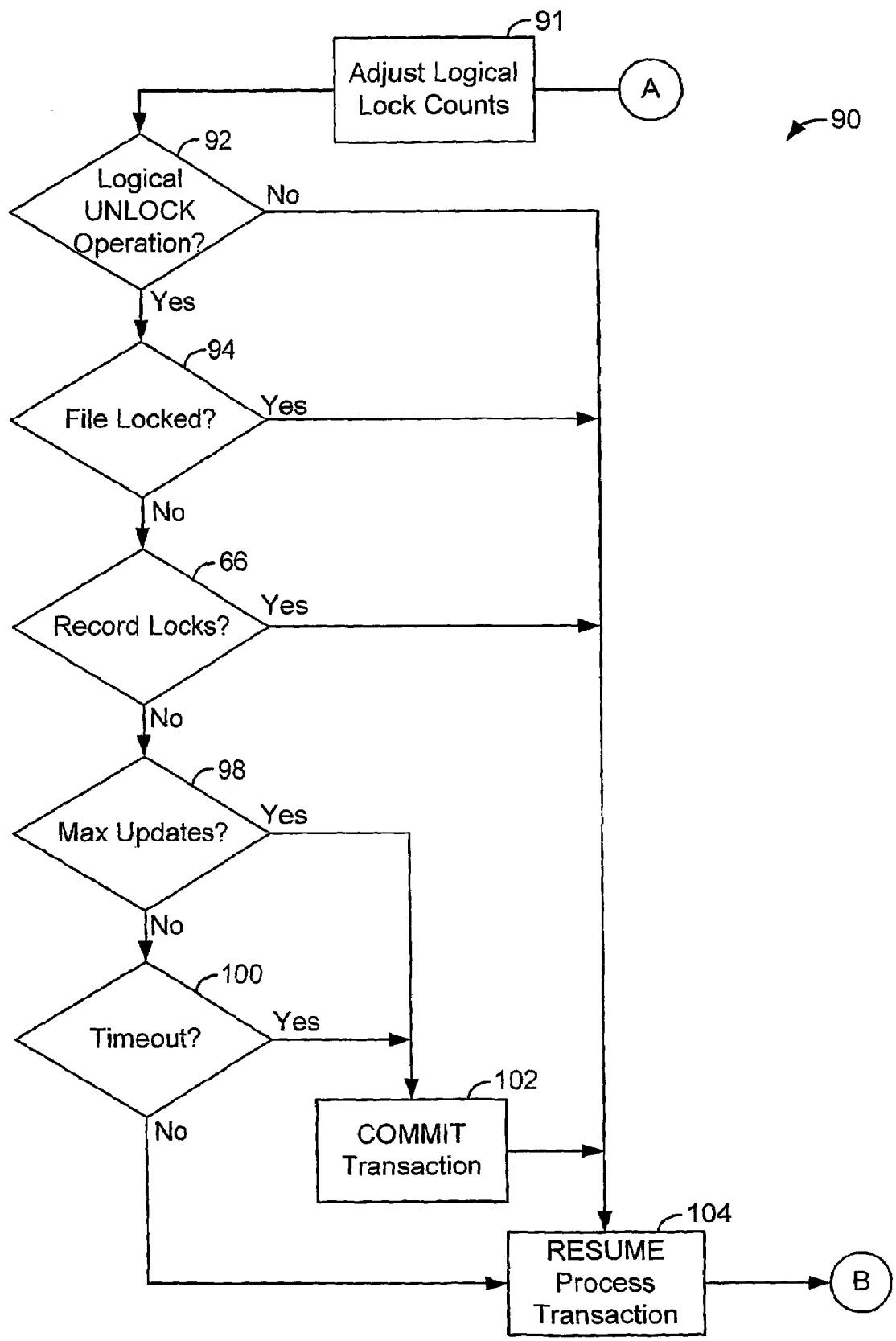
FIG. 4 is a flow diagram that broadly illustrates the major steps taken to decide whether an existing automatic transaction should be committed.

When an UPDATE, DELETE, INSERT, UNLOCK RECORD, UNLOCK FILE, or CLOSE FILE operation is complete, there is a logical (implicit or explicit) unlocking of records in a non-transactional program. Proper transaction management requires that updates of the appropriate lock counts of the logical state (Locked-File-Switch and Locked-Record-Count) be made and maintained as described in Table 1. Accordingly, as FIG. 4 shows, the first post-processing step, step 91, involves updating the various parameters maintained by the intercept module 50 in its intercept module memory 22a, depending upon the particular action being taken by the application process 30. For example, if the intercept module 50 intercepted an UNLOCK FILE or CLOSE FILE operation from the application process, the Locked-File-Switch must be set to "false" and the Locked-Record-Count to zero, as indicated in Table 1, above. On the other hand, if the intercepted operation is a READ WITH LOCK operation, the Locked-Record-Count must be incremented, or if it is a UPDATE WITH UNLOCK, the Locked-Record-Count must be decremented. Thus, step 91 performs the necessary updates, according to the intercepted operation and the rules set forth in Table 1.

Once the necessary updates are performed by step 91, the post-processing procedure of flow diagram 90 will then determine whether to commit the automatic transaction that was last used for the access to the file in question. Proceeding from step 91, to step 92, (FIG. 4), a check is made to determine if the operation has or includes a file access operation with an unlock command, control is passed to step 94.

The post-processing procedure of flow chart 90 will begin sequencing through a series of checks (steps 94–100, FIG. 4) to determine whether or not the automatic transaction should be committed (step 102):

Step 92 checks to see if the file access operation completed. If so, steps 94 and 96 Locked-File-Switch and Locked-Record-Count of the logical state to see if the file or any file records are locked. If there are locks, the procedure will proceed to step 104 without committing the transaction. Committing an automatic transaction at this point (i.e., with locked records) would release record locks that are still logically locked by the application process 30.

On the other hand, if there are no locks, the procedure of flow diagram 90 will proceed to step 98. In step 98, the procedure compares Increment Transaction-Update-Count (a count of updates made under the transaction) to a user-configured maximum value (e.g., five). If the number of updates performed under this automatic transaction has reached the configured maximum, the transaction is committed and process 90 proceeds to step 104.

If the maximum number of updates performed by this transaction has not been reached, step 98 will be followed by step 100 with a check of the elapsed time that the automatic transaction has been alive. The current time is compared to Transaction-Begin-Time. If the elapsed time has reached a configured maximum, then the automatic transaction will be committed. Thus, steps 98 and 100 ensure that a transaction is not kept open too long. Long running transactions will hold locks on the database, increasing contention for the database, and slowing down parallel operation.

If all checks are negative, process 90 proceeds to step 104 without committing the transaction.

In step 104, the transaction that the process had before the file operation was requested is restored with a RESUME operation. For a non-transactional program, the null transaction is restored, which means that the process has no active transaction.

Finally, process 90 exits at B with a return to the procedure of FIG. 3 to terminate at step 74.

There are additional operations that will cause automatic transactions to be committed, but only if the file-opens that are managed with transactions have no file or record locks. The following operations cause such transaction commits to occur:

A message is received from another process.

The process replies to a message.

The process terminates.

If Isolation is set to Normal and the process send a message to another process. See section on Isolation below.

If Isolation is set to Strong and the process reads or writes a device or writes an unaudited file. See section on Isolation below.

A key design feature of the present invention is that an automatic transaction will always committed if at all possible. There is no logic used that will cause an automatic transaction to abort, even if the process aborts its own transactions or abnormally terminates (abends).

Advanced Automatic Transaction Management Extensions

This section describes several extensions to the basic mechanism described above of automatic transactions in the present invention.

No Wait Transactions.

The operation to COMMIT a transaction usually requires a significant processing delay. If the user configures the No Wait Transaction parameter, the invention automatically performs the COMMIT operation in a way that allows the process to continue with other work while the commit processing is performed in parallel.

Use of no wait transactions does not affect reliability or database consistency. Once a no wait transaction commit has begun, only a system-level failure can cause the transaction to abort. Even if the process terminates or is stopped externally, a no wait transaction commits successfully. The only drawback to using no wait transactions is that the process continues to perform work without knowing if a system-level failure has caused an abort.

Batch processes that have multiple, separate, automatic transactions may have better performance because the multiple transactions complete in parallel. The overall performance, however, depends on the number of updates performed in each transaction.

Each time an automatic transaction begins, any previous no wait transaction for the same entity must be completed.

Common Transactions.

The present invention normally manages a single, or common, automatic transaction for all file-opens; by using a common transaction the cost of transaction processing is reduced and database consistency more closely approximates that achieved by transactional programs. The invention applies the steps described above and illustrated in FIGS. 3 and 4, (1) by employing a single transaction for all file-opens, (2) by committing the transaction only when all file-opens have no logical file or record locks, and (3) by applying the limits of Maximum Transaction Updates and Maximum Transaction Time to operations on all file-opens as a group.

Separate Transactions.

Although the present invention normally manages a single, or common, automatic transaction for all file-opens, the invention also supports a configurable mode to create a separate automatic transaction for each file-open.

Using a separate transaction can eliminate lock contention caused by some programs that have complex lock behavior. Each separate automatic transaction can be committed whenever there are no locks on the single file-open associated with the transaction.

Transaction Isolation

The type of transaction isolation selected by the user influences the duration of automatic transactions to reduce the effect of automatic transactions outside the process that started them. There are three levels of isolation:

Weak isolation commits active automatic transactions whenever the application process waits for or replies to a message from another process. The default isolation mode is weal isolation, which is sufficient for most applications and provides the best performance.

Normal isolation also commits active automatic transactions whenever a process sends a request to a server process; it is required in applications where both requester and servers lock or update the same records. If processes coordinate access to the same database records (for example, one process inserts a database record and then sends a request to a server process to update the record), a record deadlock may occur. Coordinated access in an unaudited database requires a process to unlock a record before sending a server request to access it. With automatic transactions, however, the record lock is held until the transaction is committed and the server may be blocked by the locked record.

Strong isolation also commits active automatic transactions whenever a process sends a message to a device or process, or before it updates an unaudited file; it is required only if it is unacceptable to report an update that might (with low probability) be later undone by a unilateral abort.

Note that automatic transactions are not committed if lock protocols would be violated, regardless off the isolation setting., Audited File Creation If the non-transactional application process creates a new file, it will be, typically, unaudited. The invention allows the user to configure file names that should be created as audited files, so that all data inserted in those files is protected by transactions.

The invention intercepts all system calls that create files. The intercept module then consults the Configuration Information file 54 to determine if the file being created should be audited. If so, it then performs the requested file creation with an additional specification to audit the file. Otherwise, the file creation operation is performed unchanged.

Special Operations

The section describes how the invention handles some requirements that arise in relatively few application programs.

Audit Attribute Concealment.

Most non-transactional programs are completely unaware that audited files are being accessed. Some programs, however, have instructions that inquire as to file attributes and may function improperly if the audit attribute is enabled. The invention intercepts all system calls that provide file attribute information; the invention can alter the information to conceal the audited attribute. Concealment of the audited attribute is user-configurable.

Bulk Transfers.

The computer system may support special file operations that provide very efficient loading of files by transferring large blocks of sequential data to the file. If the system transaction manager is unable to process such large amounts of information, such large transfers may not be supported for audited files.

The invention intercepts all system calls that request such bulk transfers. If the file is audited, the intercept module can perform equivalent, but smaller, operations that can be audited. The invention performs the non-bulk operations automatically, whenever required. A user who desires unaudited bulk transfers must make sure the file is not audited.

Error Processing

The invention must deal with two basic types of errors: (1) errors encountered when the intercept module attempt to perform the actual operation that was intercepted and (2) errors encountered when the intercept module attempts to perform the additional operations required to create and manage automatic transactions.

Errors of the first type are typically returned directly to the application program; these errors would have occurred with or without automatic transactions. It is the responsibility of the application program to deal with such errors as best it can. There are certain errors, however, that can only occur if files are audited. The invention must detect these errors and treat them as errors of the second type.

Errors of the second type are caused either by a logic error in the invention or by a failure of the transaction manager. They must not be returned to the application program; they also cannot be ignored. The invention deals with these errors by posting a message to the system operator console and terminating the program. As indicated above, all automatic transactions are committed, thereby ensuring that database updates are not lost.

What is claimed is:

1. A method in a computer system that supports database transaction management of providing transaction management for a non-transactional application, the method comprising:
intercepting database management instructions issued by a program of the non-transactional application;
performing the database management instructions as issued by the program;
performing transactional operations to begin and commit database transactions corresponding to the database management instructions; and
performing additional operations required for management of a transactional database,
wherein the program of the non-transactional application does not include any instructions for beginning, committing, and managing a database transaction,
wherein the program does not rely on database transactions for execution,
wherein a database for the application is configured to be transactional, and
wherein the application continues to issue database manaaement instructions as if the database is not configured to be a transactional database.

2. A method according to claim 1, wherein:
database management instructions include instructions for standard operating system and file system (OS/ES) operations.

3. A method according to claim 1, wherein:
transaction management is accomplished without first recompiling the non-transactional application.

4. A method according to claim 1, wherein:
transaction management is accomplished without first obtaining access to source code for the non-transactional application.

5. A method according to claim 1, wherein:
transaction management is accomplished without first analyzing operation of the non-transactional application.

6. A method according to claim 1, wherein:
transaction management is accomplished without first analyzing a database schema for the non-transactional application.

7. A method according to claim 1, wherein:
performing transactional operations to begin and commit database transactions corresponding to the database management instructions is accomplished without first analyzing database operations of the non-transactional application.

8. A method according to claim 1, wherein:
intercepting database management instructions includes intercepting database management instructions issued by any number of concurrently executina programs of the non-transactional application.

9. A method according to claim 1, wherein:
performing transactional operations includes concurrently accessing any number of transactional database files.

10. A method according to claim 1, wherein:
performing transactional operations includes preserving locking and concurrency control for the non-transactional application.

11. A method according to claim 1, wherein:
performing transactional operations includes performing multiple updates for multiple files in a single transaction.

12. A method according to claim 11, further comprising:
specifying a number of operations performed within each transaction in order to adjust the transaction efficiency.

13. A method according to claim 12, further comprising:
specifying a lifetime for each transaction in order to adjust the transaction efficiency.

14. A method according to claim 11, further comprising:
specifying types of externally visible operations that cause an automatic transaction to be committed in order to configure transaction isolation.

15. A method according to claim 1, further comprising:
concurrently executing at least one application that issues explicit transaction instructions for transactional database operations with the non-transactional application issuing non-transactional database management operations on the transactional database.

16. A method according to claim 1, further comprising:
configuring automatic transaction management for a first set of database files and configuring explicit transaction management for a second set of database files.

17. A method according to claim 1, further comprising:
managing multiple transactional database files with a common concurrent transaction.

18. A method according to claim 1, further comprising:
managing multiple transactional database files with multiple concurrent transactions.

19. A method according to claim 1, further comprising:
managing a first set of transactional database files with multiple concurrent transactions and, concurrently, a second set of transactional database files with a single common concurrent transaction.

20. A method according to claim 1, further comprising:
performing non-transactional bulk data transfer operations on a transactional database file.

21. A method according to claim 1, further comprising:
configuring file-creation operations for a set of file names that will cause a transactional database file to be created.

22. A method in a computer system of providing transaction management for a pre-existing non-transactional file, the method comprising:
intercepting database management instructions issued by a program of a non-transactional application;
performing the database management instructions as issued by the program;
perfonning transactional operations to begin and commit database transactions corresponding to the database management instructions; and
performing additional operations required for management of a transactional database,
wherein no prior knowledge or analysis of a database schema for the pre-existing non-transactional file is required,
wherein no prior knowledge or analysis of database operations to be performed or the pre-existing non-transactional file is required,
wherein the program and any other application programs that access the pre-existing non-transactional file are not required to begin, commit, and manage database transactions, and
wherein the program and any other non-transactional application programs continue to issue database management instructions as if the database is not configured to be a transactional database.

* * * * *